United States Patent
Kawashita

(10) Patent No.: US 7,068,378 B2
(45) Date of Patent: Jun. 27, 2006

(54) APPARATUS AND METHOD FOR MEASURING AMOUNT OF PROJECTION OF ABRASIVE GRAIN ON GRINDING TOOL

(75) Inventor: Tomoyuki Kawashita, Sasebo (JP)

(73) Assignee: President of Sasebo National College of Technology, Sasebo (JP)

( * ) Notice: Subject to any disclaimer, the term of this patent is extended or adjusted under 35 U.S.C. 154(b) by 460 days.

(21) Appl. No.: 10/614,816

(22) Filed: Jul. 9, 2003

(65) Prior Publication Data

US 2004/0008878 A1    Jan. 15, 2004

(30) Foreign Application Priority Data

Jul. 9, 2002    (JP)    ............... 2002-199940

(51) Int. Cl.
    *G01B 11/30*    (2006.01)
(52) U.S. Cl. ............. 356/600; 356/609; 451/8; 451/541
(58) Field of Classification Search .. 356/237.1–237.5, 356/394, 600, 601; 382/141, 106, 255; 451/8, 451/5, 541
    See application file for complete search history.

(56) References Cited

U.S. PATENT DOCUMENTS 4,748,335 A * 5/1988 Lindow et al. ........ 250/559.22
4,920,273 A * 4/1990 Sacks et al. ........... 250/559.08
6,939,201 B1 * 9/2005 Kawashita ................ 451/8
2004/0009736 A1 * 1/2004 Kawashita ................ 451/8

FOREIGN PATENT DOCUMENTS

| JP | 403239469 A | * 10/1991 |
| JP | 9-101131 | 4/1997 |
| JP | 10-260016 | 9/1998 |
| JP | 2000-329527 | 11/2000 |

OTHER PUBLICATIONS

K. Yokokawa, et al., "CBN Wheel Grinding Work Technology", Kogyo Chosakal, Nov. 1998, 7 pages.

* cited by examiner

*Primary Examiner*—Hoa Q. Pham
(74) *Attorney, Agent, or Firm*—Oblon, Spivak, McClelland, Maier & Neustadt, P.C.

(57) ABSTRACT

A camera unit is arranged opposite a grinding surface. While moving the focal position of the camera unit in a direction perpendicular to the grinding surface relative to the grinding surface of the grinding tool, a control unit causes the camera unit to pickup images of the grinding surface at a plurality of focal positions. Then, an already prepared basic image pattern of abrasive gains is compared with the image data obtained at the plurality of focal positions by the image pickup operation. As a result of the comparison, image data approximate to the basic of the focal position at which the detected image data was obtained.

10 Claims, 4 Drawing Sheets

APPARATUS AND METHOD FOR MEASURING AMOUNT OF PROJECTION OF ABRASIVE GRAIN ON GRINDING TOOL

CROSS-REFERENCE TO RELATED APPLICATIONS

This application is based upon and claims the benefit of priority from the prior Japanese Patent Application No. 2002-199940, filed Jul. 9, 2002, the entire contents of which are incorporated herein by reference.

BACKGROUND OF THE INVENTION

1. Field of the Invention

The present invention relates to an apparatus and method used for a grinding tool that uses a grinding surface comprising a surface of a tool base on which abrasive grains are discretely formed, to measure the amount of projection of each of the abrasive grains.

2. Description of the Related Art

In the field of grinding work, a non-porous grindstone or a porous grindstone is commonly used as a grinding tool. The non-porous grindstone uses a grinding surface comprising a peripheral surface of a grindstone base 11 to which abrasive grains 20 are stuck using a binder 13, for example, as shown in FIG. 5. If such a grindstone 10 is used for grinding work, the grindstone 10, which is shaped like a disk or a cylinder, is rotated at a high speed in the direction of an arrow A, for example, as shown in FIG. 6. Then, while abutting a grinding surface of the grindstone 10 against a surface of workpiece 30 to be ground, the workpiece 30 is moved at a constant speed in the direction of an arrow B. Thus, the ground surface of the workpiece 30 is cut to a fixed depth D by the abrasive grains 20. The surface of the workpiece 30 is thus ground. Reference numeral 31 denotes chips resulting from the cutting by the abrasive grains 20.

In grinding work of this kind, the quality of the ground surface of the workpiece 30 depends on the condition of the grinding surface of the grindstone 10. The conditions of the grinding surface are primarily determined by the shape and size of the surface of each abrasive grain 20, functioning as a cutting edge, the distribution of the abrasive grains 20, and the amount of projection of each adhesive grain 20. Thus, large grinding streaks may remain on the ground surface of the workpiece, depending on the condition of the grindstone 20. In particular, the amount of projection of each abrasive grain seriously affects the depth of the grinding streaks. FIG. 7 is a partial enlarged view showing an example of grinding streaks 32.

Accordingly, to achieve high-quality grinding work, it is important to accurately determine the conditions of the grinding surface, i.e. the shape and size of the surface of each abrasive grain 20, the distribution of the abrasive grains 20, the amount of projection of each adhesive grain 20, and the like. In particular, the amount of projection of each abrasive grain is very important because it determines the depth of the grinding streaks.

Thus, in the prior art, for example, the measuring methods described below have been proposed. As shown in FIG. 8, a measuring instrument is prepared in which a stylus 81 is provided by modifying a dial gauge 80. Then, the stylus 81 of this measuring instrument is used to measure the height from the tip of each abrasive grain to the binder 13 at the bottom of the adhesive grain. This measuring method is described in detail in Kazuhiko YOKOKAWA and Munehiko YOKOKAWA "CBN Wheel Grinding Work Technology" (published by KOGYO CHOSAKAI; a first edition published on Nov. 1, 1988).

However, with such a conventional measuring method, the height of each abrasive grain is measured by point-contacting the stylus 81 with the bottom of the abrasive grain. Thus, the measured value varies according to where the stylus contacts the grain. It is consequently difficult to obtain an accurate measured value. Further, it is contemplated that to improve measuring accuracy, the height of the abrasive grain may be determined by making measurements at a large number of measuring points and then averaging the measured values. However, with this method, the measurement requires much time, resulting in very inefficient operations.

BRIEF SUMMARY OF THE INVENTION

It is an object of the present invention to provide an apparatus and method for measuring the amount of projection of each abrasive grain on a grinding tool wherein the amount of projection of each abrasive grain on the grinding tool can be accurately measured in a short time.

In order to achieve the above object, according to an aspect of the present invention, a camera unit is arranged opposite a grinding surface. While moving the focal position of the camera unit in a direction perpendicular to the grinding surface relative to the grinding surface of the grinding tool, a control unit causes the camera unit to pickup images of the grinding surface at a plurality of focal positions. Then, an already prepared basic image pattern of abrasive gains is compared with the image data obtained at the plurality of focal positions by the image pickup operation. As a result of the comparison, image data approximate to the basic of the focal position at which the detected image data was obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

First, a brief description will be given of an apparatus and method for measuring the amount of projection of each abrasive grain on a grinding tool according to an embodiment of the present invention.

A camera unit is arranged opposite a grinding surface. While moving the focal position of the camera unit in a direction perpendicular to the grinding surface relative to the grinding surface of the grinding tool, a control unit causes the camera unit to pick up images of the grinding surface at a plurality of focal positions. Then, an already prepared basic image pattern of abrasive grains is compared with the image data obtained at the plurality of focal positions by the image pickup operation. As a result of the comparison, image data approximate to the basic image pattern is detected. Then, the amount of projection of each abrasive grain is calculated on the basis of the focal position at which the detected image data was obtained.

Accordingly, according to the embodiment of the present invention, images of the grinding surface of the grinding tool are picked up while moving the focal position of the camera unit. Then, the amount of projection of each abrasive grain is calculated on the basis of the image data obtained. Thus, compared to the conventional measuring method using a dial gauge with a stylus, the amount of projection of each abrasive grain can be easily determined in a short time.

Further, in this case, the focal position is moved step by step in increments preset on the basis of the focal depth of the camera unit. As the focal position is moved one step, image data on the grinding surface is loaded into the control unit and compared with the basic image pattern. Thus, image data containing the tip and bottom of each abrasive grain can be loaded without being missed, while eliminating the need to pick up images at a large number of focal positions. It is thus possible to further reduce the time required to calculate the amount of projection of each abrasive grain.

Furthermore, to detect image data approximate to the basic image pattern, the following two basic image patterns are stored beforehand: a first basic image pattern, corresponding to image data obtained when the focal position is set at the tip of the abrasive grain, and a second basic image pattern corresponding to image data obtained when the focal position is set at the bottom of the abrasive grain. Then, the first and second basic image patterns are compared with image data obtained at a plurality of focal positions by the camera unit. It is thus possible to detect image data obtained when the tip and bottom of the abrasive grain are each in focus, without the need to compare the image data with the basic image pattern many times. This also reduces the time required to calculate the amount of projection of the abrasive grain.

Figure 1:
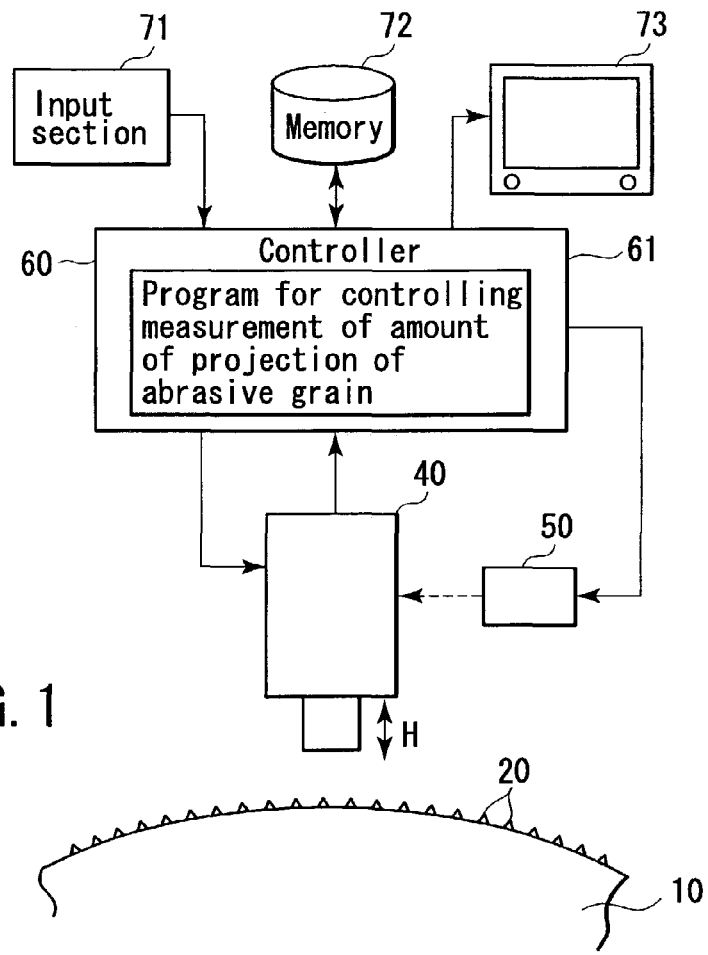
FIG. 1 is a schematic view showing a configuration of an embodiment of an apparatus for measuring the amount of projection of an abrasive grain according to the present invention.

FIG. 1 is a view showing a configuration of an apparatus for measuring the amount of projection of each abrasive grain according to an embodiment of the present invention. A grindstone 10 comprises a tool base 11 shaped like a disk or a cylinder and to which abrasive grains 20 are stuck using a binder 13. A grinding surface comprises a surface of the tool base 11 on which the abrasive grains 20 are formed. The grindstone 10 is mounted over a rotating shaft and is rotatively driven by the rotating shaft to rotate in the direction of an arrow W.

A microscope 40 with a camera is disposed opposite the grinding surface of the grindstone 10. The microscope 40 with the camera constitutes a camera unit together with a focusing mechanism 50. It comprises a metallurgical microscope of a high magnification in which a digital camera is installed. The microscope 40 with the camera picks up an image of the grinding surface of the grindstone 10 with a predetermined magnification in response to a driving instruction from a controller 60. It then outputs the picked-up image data to the controller 60. The focusing mechanism 50 moves an optical system of the microscope 40 with the camera in the direction of an arrow H in the figure in accordance with a focus control instruction given by the controller 60. Then, the focusing mechanism 50 moves the focal position of the microscope 40 with the camera in a direction perpendicular to the grinding surface relative to the grinding surface.

The controller 60 constitutes a control unit together with an input section 71, a memory 72, and a display 73. The controller 60 comprises a microcomputer as a main control section. A program memory in the microcomputer stores a control program 61 for measuring the amount of projection of an abrasive grain, in order to implement control functions relating to the present invention. The control program 61 for measuring the amount of projection of an abrasive grain is activated in response to an inspection start instruction given by the input section 71. The control program 61 controls measurements of the amount of projection of an abrasive grain in accordance with a preset control procedure.

Figure 2:
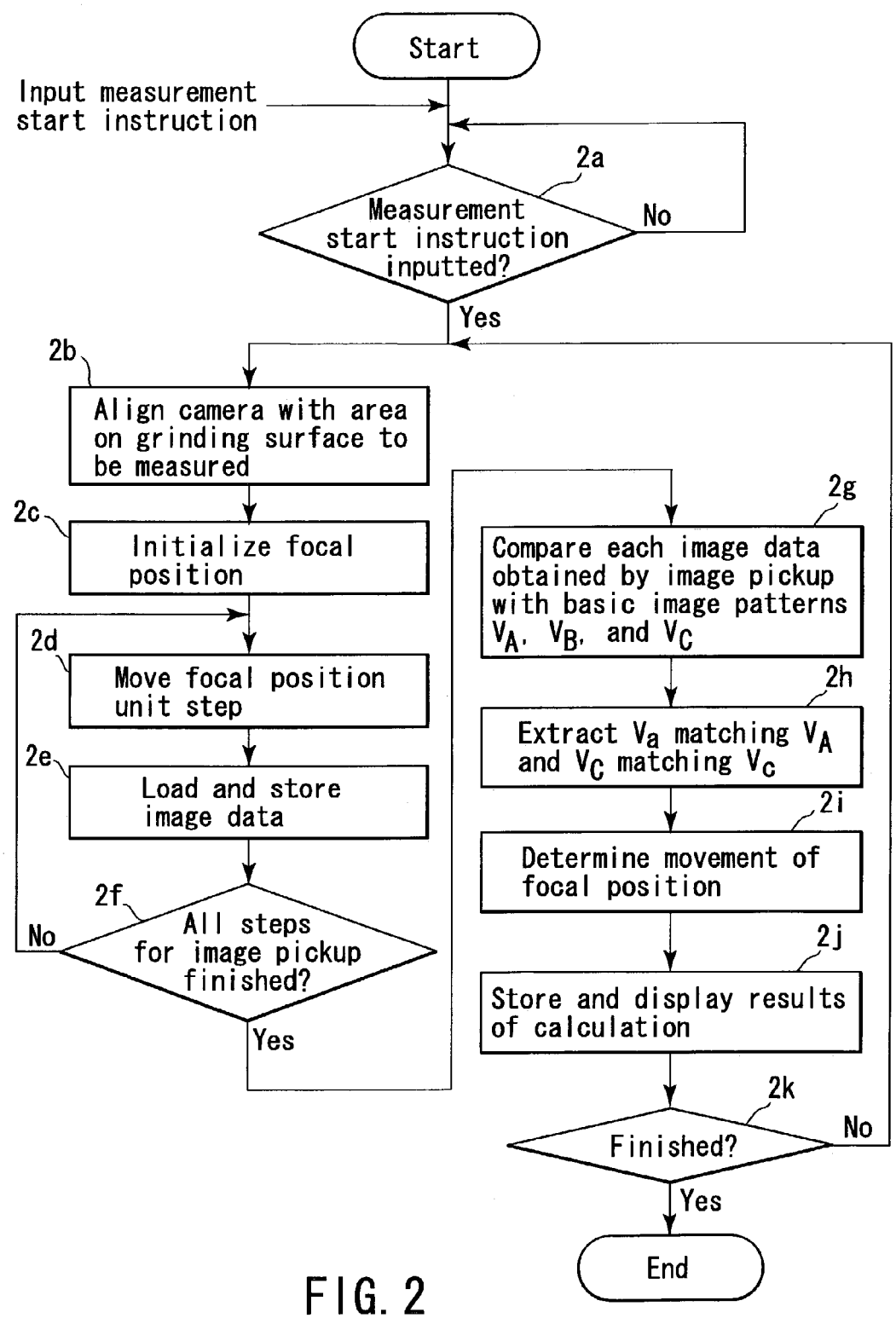
FIG. 2 is a flow chart showing a measurement control procedure executed by a controller of the measuring apparatus shown in FIG. 1 as well as the contents of the control.

Now, description will be given of operations performed by the measuring apparatus configured as described above as well as a measuring method. FIG. 2 is a flow chart showing a control procedure executed by the controller 60 as well as the contents of the control.

Before measurements, the grindstone 10 to be inspected is installed over the rotating shaft. After the installation has been completed, an operator inputs a measurement start instruction from the input section 71.

The controller 60 starts to monitor an input of a measurement start instruction at step 2a in FIG. 2. Then, in this state, on detecting an inputted measurement start instruction, the controller 60 first drives, at step 2b, a rotative driving mechanism (not shown) for the grindstone 10 to rotatively move the grindstone 10 at a low speed. Then, an area on the grinding surface to be measured is positioned opposite the microscope 40 with the camera.

Then at step 2c, the controller 60 gives a focus control instruction to the focusing mechanism 50. This allows the focal position of the microscope 40 with the camera to be initialized with respect to the area on the grinding surface to be measured. At this time, the initialized position of the focus is set between the tip of any of the abrasive grains 20 and the microscope 40 with the camera.

Subsequently at step 2d, the controller 60 moves the focal position of the microscope 40 with the camera a step amount in the direction of an optical axis (the direction perpendicular to the grinding surface). Then at this first focal position, the microscope 40 with the camera performs an image pickup operation. As a result, at the set first focal position, the microscope 40 with the camera picks up an image of the area on the grinding surface to be measured and inputs this digital image data to the controller 60. At step 2e, the controller 60 loads the digital image data. Then, the controller 60 stores the loaded digital image data in an image data storage area in the memory 72 in association with focal position information indicating the first focal position.

Once the image pickup operation at the first focal position is finished, the controller 60 determines at step 2f whether or not images have been picked up at all the focal positions (whether or not all the steps have been completed). If an image pickup operation has not been performed at a certain focal position, the procedure returns to step 2d to move the focal position of the microscope 40 with the camera the step amount closer to the grinding surface. Then, the controller 60 causes the microscope 40 with the camera to perform an image pickup operation at this second focal position. Digital image data obtained by this image pickup operation is stored in the image data storage area in the memory 72 in association with focal position information indicating the second focal position.

Subsequently, in every process, the focal position is moved the step amount closer to the grinding surface. Every time the focal position is moved one step, the microscope 40 with the camera picks up an image of the grinding surface at this focal position. Then, the digital image data obtained by this image pickup operation is stored in the image data storage area in the memory 72 in association with focal position information indicating this focal position. The final focal position is set at a position slightly below the bottom of the abrasive grain, i.e. slightly below the surface of the grindstone base 11 and inward of the grindstone 11.

The step amount for the focal position is set at a value equivalent to or slightly smaller than the focal depth of the microscope 40 with the camera. Thus, the focal position is varied step by step in increments of a value almost equal to the focal depth. As a result, image data on the grinding surface is obtained in increments of the value equal to the focal depth.

Once images of the grinding surface have been picked up at all the focal positions, the controller 60 sequentially reads the digital image data on each focal position from the image data storage area in the memory 72. Then, the controller 60 compares the read digital image data with a basic image pattern read from a basic pattern storage area.

In this case, the basic image pattern described below is stored in the basic image pattern storage area in the memory 72. FIGS. 3 and 4 are views illustrating a specific example of a basic image pattern.

Figure 3A:
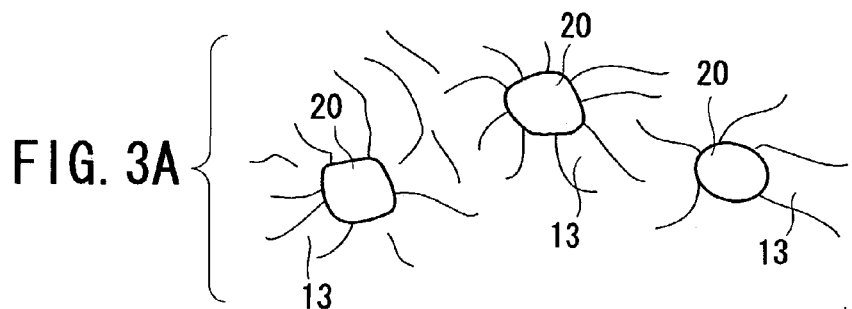
FIGS. 3A and 3B are a plan view and a side view showing an example of the shape of an abrasive grain measured by the apparatus shown in FIG. 1.
Figure 3B:
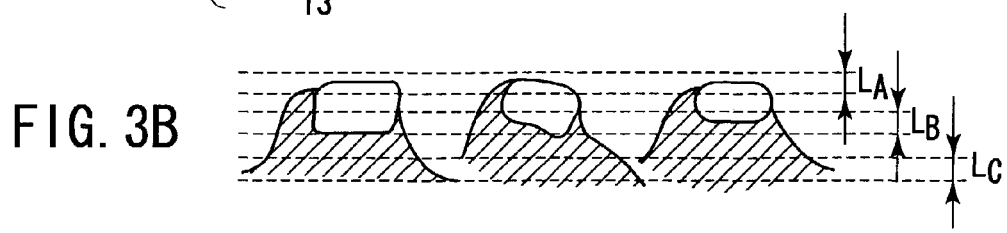
Figure 4A:
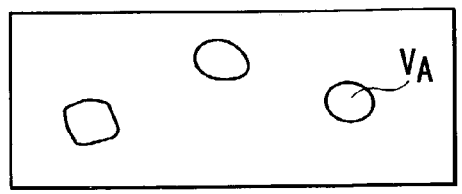
FIGS. 4A, 4B, and 4C are views showing a basic image pattern of abrasive grains which varies when the focus of a camera of the apparatus shown in FIG. 1 is moved.
Figure 4B:
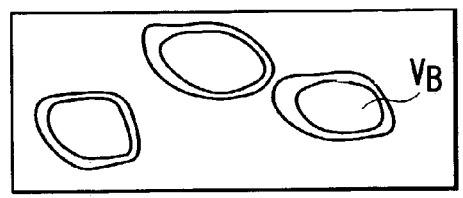
Figure 4C:
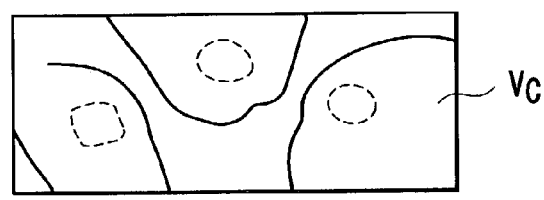
Figure 5:
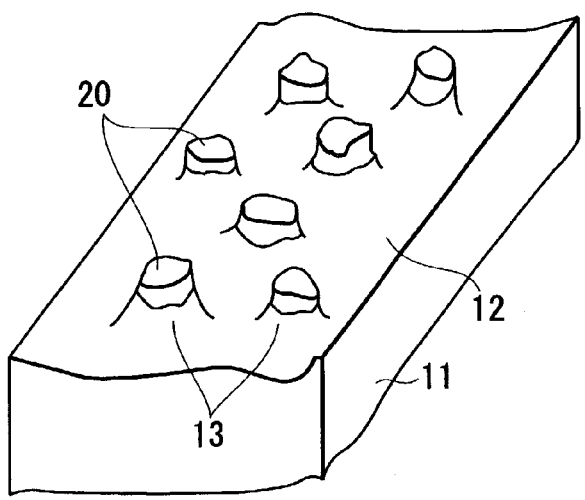
FIG. 5 is an enlarged schematic view showing a grinding surface of a common grindstone.
Figure 6:
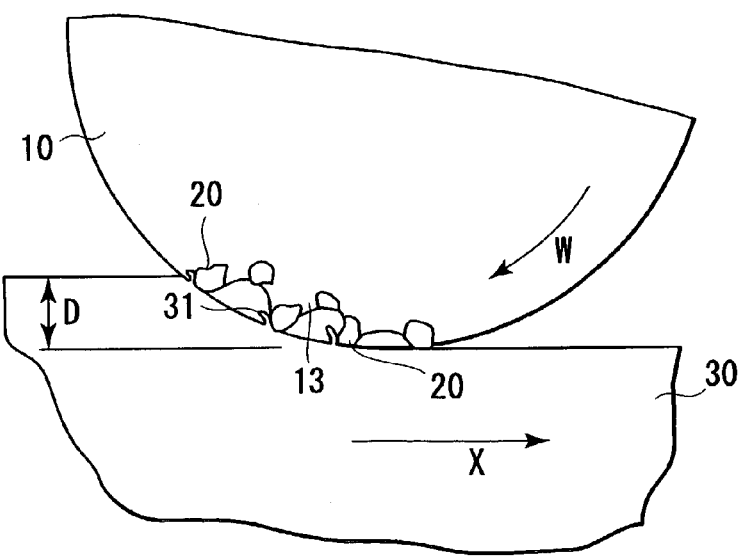
FIG. 6 is a view showing an example of grinding work that uses the grindstone shown in FIG. 5.
Figure 7:
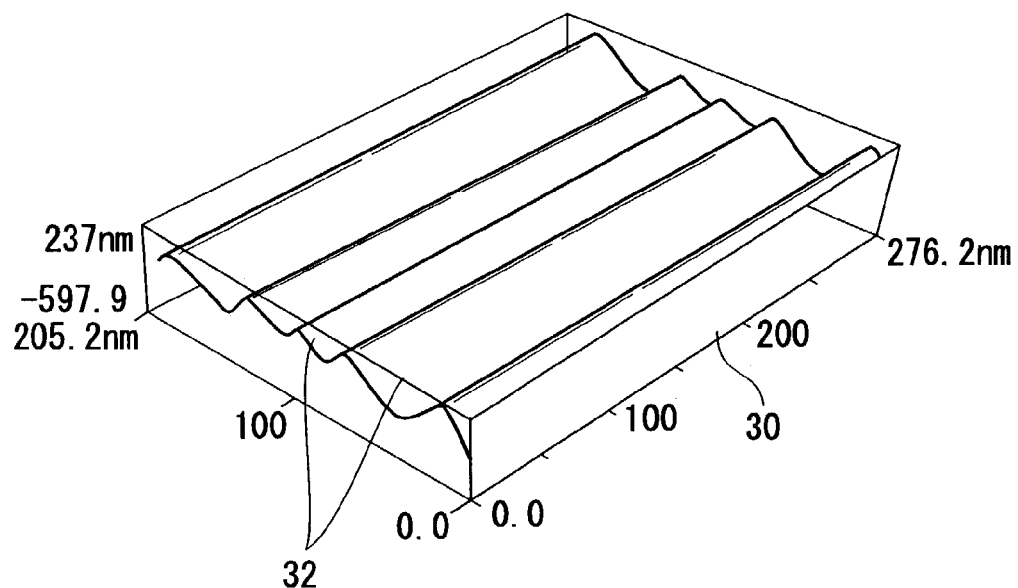
FIG. 7 is an enlarged view of the conditions of a ground surface of a workpiece after grinding work.
Figure 8:
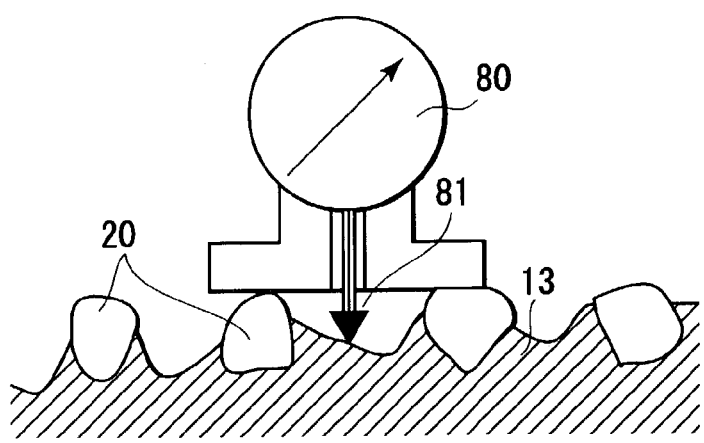
FIG. 8 is a view illustrating a conventional method of measuring the amount of projection of an abrasive grain.

Specifically, the abrasive grains 20 are discretely arranged as shown in FIG. 3A. Then, images of these abrasive grains 20 are picked up from vertically above. First, when the focal position is within a range $L_A$ in FIG. 3B, i.e. when it is within the range containing the tip of the abrasive grain 20, image data is obtained in which the tip of the abrasive grain 20 has a quasi-cylindrical contour as shown at $V_A$ in FIG. 4A. Further, when the focal position is within a range $L_B$ in FIG. 3B, i.e. when it is between the tip and bottom of the abrasive grain 20, image data is obtained in which the abrasive grain 20 has a donut-shaped contour as shown at $V_B$ in FIG. 4B. Furthermore, when the focal position is within a range $L_C$ in FIG. 3B, i.e. when it is within the range containing the bottom of the abrasive grain 20, image data is obtained in which the contour of the abrasive grain 20 appears to have collapsed and spread as shown at $V_C$ in FIG. 4C. In this respect, the focal depth corresponds to each of the distances shown by $L_A$, $L_B$, and $L_C$.

Thus, in this embodiment, the basic pattern storage area in the memory 72 stores the first basic image pattern $V_A$, obtained when the focal position is set at the tip of the abrasive grain 20, the second basic image pattern $V_C$, obtained when the focal position is set at the bottom of the abrasive grain 20, and the third basic image pattern $V_B$, obtained when the focal position is set at the tip and bottom of the abrasive grain 20.

At step 2g, the controller 60 compares each of the basic image patterns $V_A$, $V_B$, and $V_C$ with the digital image data obtained at each focal position by image pickup. Then, on the basis of the results of the comparison, the controller 60 detects digital image data that matches each basic image pattern within the predetermined range of differences. Then, at step 2h, from the detected digital image data, the controller 60 extracts digital image data Va having the smallest difference from the first basic image pattern $V_A$ and digital image data Vc having the smallest difference from the second basic image pattern $V_C$. Subsequently, the controller 60 reads the focal positions at which the digital image data Va and Vc were obtained by image pickup, from the image data storage area in the memory 72. Then, at step 2i, the controller 60 determines the difference between these focal positions to calculate the amount of projection of the abrasive grain 20.

At step 2j, the calculated amount of projection of the abrasive grain 20 is stored in a calculation result storage area in the memory 72 in association with information indicating the area on the grinding surface to be measured. This amount is also displayed on the display 73. If the system is provided with a printer, the latter may be used to print out the results of the calculation. Alternatively, the results may be transmitted to another computer or the like via connection cable or a communication line.

Once this area to be measured has been completely measured, the controller 60 returns to step 2b in order to execute a measuring process on a next area to be measured. The controller 60 repeatedly executes the above series of control operations. The areas to be measured are set at the intervals of fixed angles. Then, on detecting at step 2k that all the areas to be measured have been completely measured, the controller 60 completes the measuring process on this grindstone 10.

As described above, in the embodiment, for a position on the grinding stone 10 to be measured, images of the grinding surface are picked up while varying the focal position of the microscope 40 with the camera step by step in the direction perpendicular to the grinding surface. Then, the image data thus obtained is compared with the basic image pattern $V_A$, corresponding to the tip of the abrasive grain 20, and the basic image pattern $V_C$, corresponding to the bottom of the abrasive grain 20, both basic image patterns being already stored. Then, image data that approximate to the basic image patterns $V_A$ and $V_C$ is extracted. Subsequently, the amount of projection of the abrasive grain 20 is calculated on the basis of the difference between the focal positions at which the extracted image data was obtained by image pickup.

Therefore, according to the present invention, images of the grinding surface can be picked up while varying the focal position, and the amount of projection of the abrasive grain 20 can then be determined on the basis of the image data thus obtained. Thus, compared to the conventional measuring method using a dial gauge with a stylus, the amount of projection of each abrasive grain can be easily determined in a short time.

Further, the basic image patterns for comparison are limited to those corresponding to the tip and bottom of the abrasive grain 20. This eliminates the need to execute an image comparing process many times. It is thus possible to reduce the time required to calculate the amount of projection of the abrasive grain 20.

Furthermore, the step intervals for the focal positions are each set to be equivalent to or slightly smaller than the focal depth of the microscope 40 with the camera. Thus, image data can be obtained for a necessary and sufficient number of focal positions. As a result, image data containing the tip and bottom of the abrasive grain 20 can be obtained without being missed, while eliminating the need to pick up images at a large number of focal positions. It is thus possible to further reduce the time required to calculate the amount of projection of the abrasive grain 20.

Furthermore, image data obtained at each focal position is stored in the image data storage area in the memory 72. After all the image data on the respective focal positions have been stored, the image data is sequentially read from the image data storage area in the memory 72. The image data is then compared with the basic image pattern. Consequently, this system can be advantageously implemented without expensive processors or high performance, high speed image processing circuits.

Moreover, a plurality of areas to be measured are set on the grinding surface of the grindstone 10 at the intervals of fixed angles. The system is provided with a function of positioning the microscope 40 with the camera with respect to each of these areas to be measured. Thus, the amount of projection of the abrasive grain 20 can be sequentially and automatically measured at the plurality of areas on the grinding surface to be measured. This enables the conditions of the grinding surface to be efficiently measured all over this surface.

The present invention is not limited to the above embodiment. For example, the two arrangements below can be used as means for loading and comparing image data with the basic image pattern.

The first arrangement sequentially loads image data on a plurality of focal positions from the camera unit and stores the data in the memory. Then, after all the image data on the plurality of focal positions has been stored in the memory, the image data is individually read from the memory and compared with the basic image pattern. This process is repeatedly executed. This arrangement allows the comparison with the basic image pattern to be executed after total the image data on the plurality of focal positions has been stored. It is thus possible to execute an image comparing process using a processor or image processing circuit that has a low processing speed.

The second arrangement loads image data on the grinding surface from the camera unit into the controller every time the focal position is moved one step. Then, whenever image data on one focal position is loaded, the loaded image data is compared with the basic image pattern. This arrangement enables the real-time execution of a process including alignment with one focal position, the pickup of an image at this focal position, and the comparison of the image data obtained by this image pickup operation. Therefore, the second arrangement allows measurements to be finished in a shorter time than the first arrangement.

Furthermore, the grinding tool and the camera unit are moved relative to the grinding surface in a horizontal direction. Then, the arranged position of the camera unit is aligned with each of the plurality of areas on the grinding surface to be measured. This arrangement enables the amount of projection of each abrasive grain to be sequentially and automatically measured at the plurality of areas on the grinding surface to be measured. Therefore, the conditions of the grinding surface can be efficiently measured all over this surface.

Further, in the above embodiment, the focal position of the microscope 40 with the camera is moved step by step, and an image of the grinding surface is picked up at each step. However, the present invention is not limited to this aspect. The focus of the microscope 40 with the camera may be continuously varied at a constant variation speed. Then, frames of image data may be extracted at fixed time intervals from the image data obtained during this variation period by the microscope 40 with the camera. Subsequently, each of the extracted frames of image data may be compared with the basic image pattern.

Furthermore, in the description of the above embodiment, a non-porous grindstone has been taken as an example. However, the present invention is applicable to the measurement of the amount of projection of each abrasive grain on a porous grindstone. Moreover, many variations may be made to the step intervals for the focal positions, the number of basic image patterns provided, the measurement procedure executed by the controller and its contents, the type and configuration of the camera unit, the type and configuration of the controller, and the like without departing from the spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A measuring apparatus used for a grinding tool using a grinding surface comprising a surface of a tool base on which a large number of abrasive grains are discretely formed, to measure the amount of projection of each of the abrasive grains, the apparatus comprising:

a camera unit provided opposite the grinding surface to pick up an image of the grinding surface; and a control unit connected to the camera unit, the control unit comprising:

means for moving a focal position of the camera unit in a direction perpendicular to the grinding surface;

means for causing the camera unit to pick up the image of the grinding surface synchronized with movement of the focal position;

means for storing a first basic image pattern corresponding to an image obtained when the focal position is set at the tip of the abrasive grain, a second basic pattern corresponding to an image obtained when the focal position is set at the bottom of the abrasive grain, and a third basic image pattern obtained when the focal position is set at the tip and bottom of the abrasive grain;

means for comparing the image data, every time the data is obtained, with the first, second and third basic image patterns means for detecting image data approximate to the first, second, and third image patterns on the basis of a result of the comparison; and means for calculating the amount of projection of the abrasive grains on the basis of the focal position at which the detected image data was obtained by the camera unit.

2. The measuring apparatus according to claim 1, wherein the means for moving the focal position moves the focal position step by step in increments preset on the basis of a focal depth of the camera unit, and the means for causing the camera unit to pick up an image of the grinding surface causes the camera unit to pick up the image of the grinding surface every time the focal position is moved.

3. The measuring apparatus according to claim 1, wherein the means for causing the camera unit to pick up an image of the grinding surface stores, in an image memory, a plurality of image data obtained by the camera unit while the focal position is being moved within a preset movement range, and after the plurality of image data has been stored, the detection means sequentially reads the plurality of stored image data from the image memory to compare each image data with the basic image patterns.

4. The measuring apparatus according to claim 1, wherein every time the focal position is moved a specified distance, the means for causing the camera unit to pick up the image of the grinding surface loads one frame of the image data obtained at the focal position by the camera unit, and every time the one frame of the image data is loaded, the detection means compares the loaded one frame of the image data with the basic image pattern.

5. The measuring apparatus according to claim 1, wherein the control unit further comprises:

means for moving the grinding tool and the camera unit in a horizontal direction relative to the grinding surface; and means for utilizing the horizontal movement to place the camera unit opposite each of a plurality of positions on the grinding surface to be measured.

6. A measuring method used for a grinding tool using a grinding surface comprising a surface of a tool base on which a plurality of abrasive grains are discretely formed, to measure an amount of projection of the abrasive grains, the method comprising:

a step of picking up an image of the grinding surface while moving a focal position of a camera in a direction perpendicular to the grinding surface;

a step of comparing the image data, every time the data is obtained, with a first basic image pattern corresponding to an image obtained when the focal position is set at the tip of the abrasive grain, a second basic pattern corresponding to an image obtained when the focal position is set at the bottom of the abrasive grain, and a third basic image pattern obtained when the focal position is set at the tip and bottom of the abrasive grain;

a step of detecting image data approximate to the first, second, and third image pattern on the basis of a result of the comparison; and a step of calculating the amount of projection of the abrasive grains on the basis of the focal position at which the detected image data was obtained by the camera.

7. The measuring method according to claim 6, wherein the step of picking up the image of the grinding surface comprises moving the focal position step by step in increments preset on the basis of a focal depth of the camera and picking up the image of the grinding surface every time the focal position is moved.

8. The measuring method according to claim 6, wherein the step of picking up an image of the grinding surface stores the plurality of image data obtained by the camera while the focal position is being moved within a preset movement range, and the step of detecting image data comprises, after the plurality of image data have been obtained by the camera and stored, sequentially reads the plurality of stored image data to compare each image data with the basic image patterns.

9. The measuring method according to claim 6, wherein the step of picking up an image of the grinding surface comprises loading one frame of the image data obtained at the focal position by the camera every time the focal position is moved a specified distance, and the step of detecting image data comprises, every time the one frame of the image data is loaded, comparing the loaded one frame of the image data with the basic image pattern.

10. The measuring method according to claim 6, further comprising:

a step of moving, before picking up the image of the grinding surface, the grinding tool and the camera in a horizontal direction relative to the grinding surface and aligning an image pickup surface of the camera with a position on the grinding surface to be measured.

* * * * *